US011401850B2

(12) United States Patent
Mori

(10) Patent No.: US 11,401,850 B2
(45) Date of Patent: Aug. 2, 2022

(54) EXHAUST GAS PURIFICATION CATALYST

(71) Applicant: TOKYO ROKI CO., LTD., Kanagawa (JP)

(72) Inventor: Takayuki Mori, Kanagawa (JP)

(73) Assignee: TOKYO ROKI CO., LTD., Kanagawa (JP)

( * ) Notice: Subject to any disclaimer, the term of this patent is extended or adjusted under 35 U.S.C. 154(b) by 0 days.

(21) Appl. No.: 17/056,264

(22) PCT Filed: May 17, 2019

(86) PCT No.: PCT/JP2019/019780
§ 371 (c)(1),
(2) Date: Nov. 17, 2020

(87) PCT Pub. No.: WO2019/221292
PCT Pub. Date: Nov. 21, 2019

(65) Prior Publication Data
US 2021/0215074 A1    Jul. 15, 2021

(30) Foreign Application Priority Data
May 17, 2018   (JP) .............................. JP2018-095460

(51) Int. Cl.
| *B01J 29/06* | (2006.01) |
| *B01J 35/02* | (2006.01) |
| *F01N 3/035* | (2006.01) |
| *F01N 3/08* | (2006.01) |
| *F01N 3/20* | (2006.01) |
| *F01N 3/28* | (2006.01) |

(52) U.S. Cl.
CPC .............. *F01N 3/035* (2013.01); *B01J 29/06* (2013.01); *B01J 35/023* (2013.01); *B01J 35/026* (2013.01); *F01N 3/0842* (2013.01); *F01N 3/208* (2013.01); *F01N 3/28* (2013.01); *F01N 2370/04* (2013.01)

(58) Field of Classification Search
CPC .... B01D 46/2418; B01D 53/92; B01D 53/94; B01D 2201/62; B01D 2239/1241; B01D 2239/125; B01D 2253/108; B01D 2253/304; B01D 2255/304; B01D 2255/50; B01D 2258/012; B01D 2255/9202; B01D 2255/9155; B01D 53/9418; B01J 29/00; B01J 29/04; B01J 35/023; B01J 29/7015; B01J 35/026; B01J 29/06; F01N 3/021; F01N 3/035; F01N 2330/06; F01N 2510/063; F01N 3/2066; F01N 3/28; F01N 3/0842; F01N 3/2828; F01N 2370/04; F01N 3/208; Y02T 10/12

See application file for complete search history.

(56) References Cited

U.S. PATENT DOCUMENTS

| 2010/0092358 | A1 | 4/2010 | Koegel et al. | |
|---|---|---|---|---|
| 2011/0212007 | A1 | 9/2011 | Lu et al. | |
| 2012/0258032 | A1* | 10/2012 | Phillips | B01J 29/763 423/239.2 |
| 2017/0326538 | A1* | 11/2017 | Miyashita | B01J 29/763 |
| 2017/0333883 | A1 | 11/2017 | Mohanan et al. | |
| 2018/0133648 | A1 | 5/2018 | Sekine et al. | |
| 2019/0160427 | A1* | 5/2019 | Deeba | B01J 23/63 |

FOREIGN PATENT DOCUMENTS

| EP | 1957185 A1 | 8/2008 |
|---|---|---|
| JP | 2005-152774 A | 6/2005 |
| JP | 2010-501326 A | 1/2010 |
| JP | 2012-052546 A | 3/2012 |
| JP | 2014-198654 A | 10/2014 |
| JP | 2015-112559 A | 6/2015 |
| JP | 2017-519627 A | 7/2017 |
| WO | 2007/058867 A1 | 5/2007 |
| WO | 2017/100384 A1 | 6/2017 |
| WO | 2017/134007 A1 | 8/2017 |
| WO | 2017/163984 A1 | 9/2017 |

OTHER PUBLICATIONS

International Preliminary Report on Patentability issued in corresponding International Application No. PCT/JP2019/019780 dated Nov. 17, 2020 (10 pages).
International Search Report and Written Opinion issued in corresponding International Application No. PCT/JP2019/019780 dated Jul. 30, 2019 (11 pages).
Notice of Reasons for Refusal issued in corresponding Japanese Application No. 2020-519954 dated Nov. 30, 2021 (10 pages).
Extended European Search Report issued in corresponding European Application No. 19804277.2, dated Jan. 21, 2022 (8 pages).

* cited by examiner

*Primary Examiner* — Timothy C Vanoy
(74) *Attorney, Agent, or Firm* — Osha Bergman Watanabe & Burton LLP

(57) ABSTRACT

To provide an exhaust gas purification catalyst that is less likely to cause an increase in pressure loss, even a large amount of zeolite-based SCR catalyst is used to improve NOx purification capability. The exhaust gas purification catalyst includes a DPF provided with zeolite having a primary particle size equal to or less than 0.5 μm. In addition, it is preferable that 50% particle size of the zeolite measured by dynamic light scattering is equal to or less than 2.0 μm, and further, it is preferable that the 90% particle size of the zeolite is equal to or less than 2.5 μm.

5 Claims, 5 Drawing Sheets

EXHAUST GAS PURIFICATION CATALYST

TECHNICAL FIELD

The present disclosure relates to an exhaust gas purification catalyst, and more particularly to an SCR-support DPF catalyst having high NOx purification capability.

BACKGROUND ART

Exhaust gas purification systems are used to treat exhaust gas discharged from automotive vehicles. In order to downsize the exhaust gas purification systems, development is in progress of an SCR-support DPF catalyst (hereinafter referred to as "SCR/DPF catalyst") capable of achieving both capability of collecting PM (particulate matters) contained in exhaust gas and NOx purification capability.

Selective catalytic reduction (SCR) catalyst is a catalyst with which NOx is reduced to $N_2$ and $H_2O$ using urea or ammonia produced by hydrolysis of urea as a reducing agent. A diesel particulate filter (DPF) includes a diesel particulate collection filter for removing PM. Upon use, the DPF provided with the SCR catalyst (the SCR/DPF catalyst) is disposed, for example, at the bottom of an automotive vehicle.

Here, examples of the SCR catalyst include a zeolite-based SCR catalyst, which is currently mainstream (see, for example, PTL 1). The zeolite-based SCR catalyst has higher NOx purification capability than an ordinary SCR catalyst.

CITATION LIST

Patent Literature

PTL 1: Japanese Patent Application Publication No. 2012-52546

SUMMARY OF INVENTION

Technical Problem

However, an increase in pressure loss in association with SCR catalyst support is an issue when putting an SCR/DPF catalyst into practical use. Such an increase in pressure loss leads to a deterioration of fuel efficiency. Specifically, in order to improve NOx purification capability, it is necessary to provide the DPF with a large amount of SCR catalyst. Meanwhile, in cases where a large amount of SCR catalyst is provided to the DPF and when PM in exhaust gas is collected by the DPF, pressure loss is likely to increase due to an accumulation of PM.

Here, the foregoing zeolite-based SCR catalyst has a low bulk specific gravity. Accordingly, when the SCR/DPF catalyst is prepared by providing the DPF with a large amount of zeolite-based SCR catalyst, pores of the DPF become clogged, and thus PM is likely to accumulate. In other words, in cases where zeolite-based SCR catalyst is used, pressure loss is likely to further increase.

In view of such circumstances, the present disclosure is directed to providing an exhaust gas purification catalyst that is less likely to cause an increase in pressure loss even with the use of a large amount of zeolite-based SCR catalyst.

Solution to Problem

In other words, an aspect of the present disclosure includes an exhaust gas purification catalyst comprising: a DPF provided with a zeolite having a primary particle size equal to or less than 0.5 μm.

Further, it is desirable that 50% particle size of the zeolite measured by dynamic light scattering is equal to or less than 2.0 μm.

Further, it is desirable that 90% particle size of the zeolite measured by dynamic light scattering is equal to or less than 2.5 μm.

Further, it is desirable that 50% particle size of the zeolite when the zeolite is in a slurried state is equal to or less than 2.0 μm.

Further, it is desirable that the slurry has a viscosity equal to or less than 20 mPa·s at 25° C.

Advantageous Effects of Invention

According to the present disclosure, it is possible to provide an exhaust gas purification catalyst that is less likely to cause an increase in pressure loss even with the use of a large amount of zeolite-based SCR catalyst.

DESCRIPTION OF EMBODIMENTS

Figure 1:
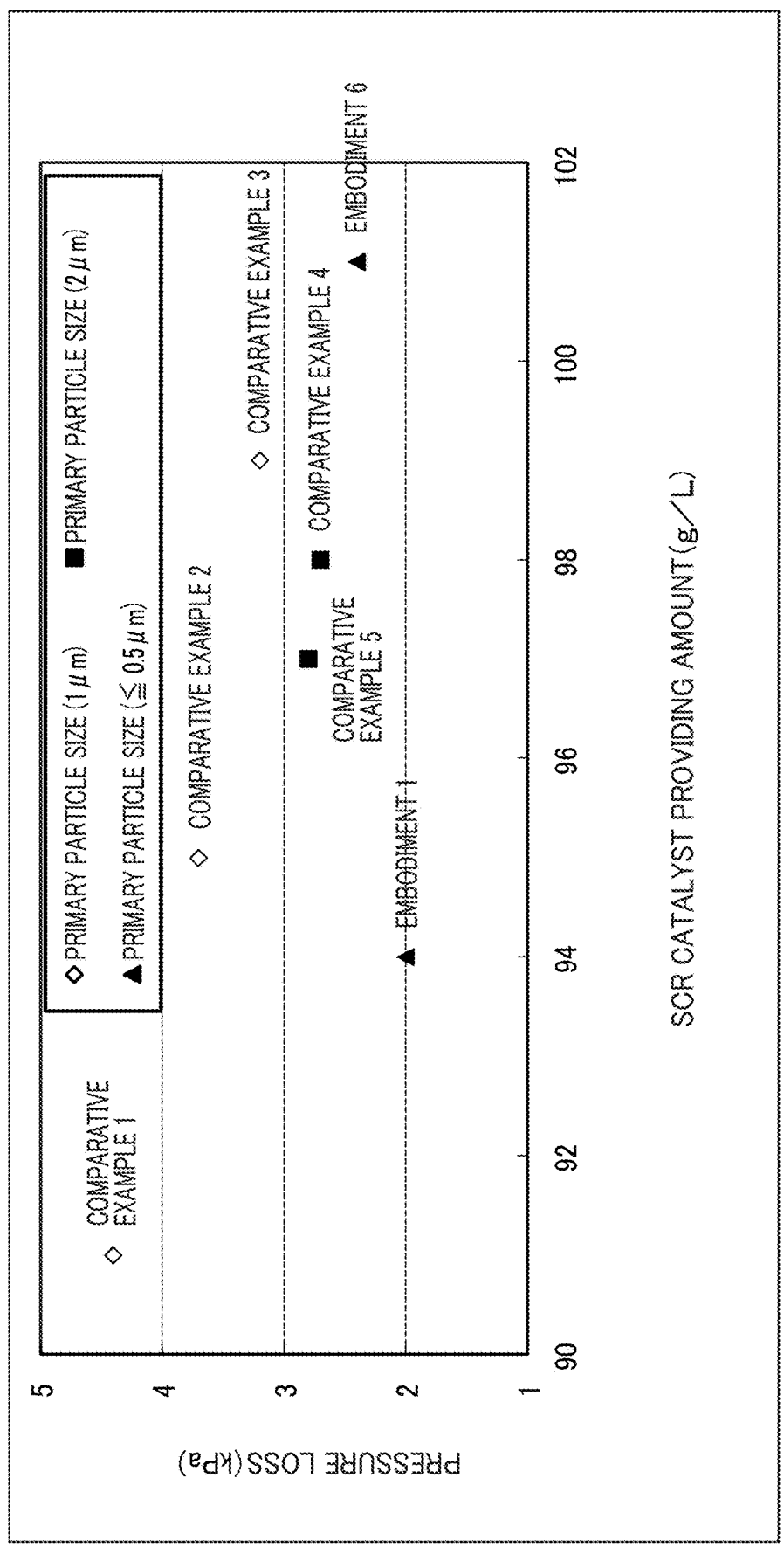
FIG. 1 is a graph illustrating a relationship between the amount of SCR catalyst provided to DPF and pressure loss in embodiments and comparative examples.

Hereinafter, embodiments of the present disclosure will be described, although the scope of the present disclosure is not limited to the present description including embodiments. Further, shall represent "weight percent" unless otherwise specified.

<Exhaust Gas Purification Catalyst>

An SCR/DPF catalyst is a catalyst with which NOx is reduced to harmless $N_2$ and $H_2O$ by SCR catalyst, as well as PM contained in the exhaust gas discharged from an engine of an automotive vehicle is collected using a DPF. The SCR/DPF catalyst is usually provided at the bottom of the automotive vehicle.

<DPF>

Examples of a DPF substrate includes cordierite, SiC, alumina titanate, and the like, but are not limited thereto.

Examples of a structure used for the DPF includes a wall-flow structure. This structure includes a plurality of exhaust gas flow passages (honeycomb cells) extending in parallel with each other.

The exhaust gas flow passages include: exhaust gas inflow passages each having its downstream end blocked (sealed) by a plug; exhaust gas outflow passages each having its upstream end blocked (sealed) by a plug; and porous partition walls.

The exhaust gas inflow passages and the exhaust gas outflow passages are separated from each other by the partition walls.

Pores of the partition walls of the DPF are provided with the SCR catalyst. The SCR/DPF catalyst is obtained by providing the SCR catalyst to the DPF. Note that this includes a form in which part of a plurality of pores is provided with the SCR catalyst and other pores are coated. The details of the SCR catalyst will be described below.

With the use of such an SCR/DPF catalyst, exhaust gas components entering from the exhaust gas inflow passage passes through the partition walls and moves to the exhaust gas outflow passages. At this time, solid PM are collected by the countless pores provided in the partition walls. In addition, NOx is purified with the SCR catalyst provided to the pores in the partition walls (or with the SCR catalyst coating the pores).

In this way, the SCR/DPF catalyst according to an embodiment of the present disclosure has both PM collection capability and NOx purification capability as described above. Note that the combination of the SCR/DPF catalyst and a known urea adding device can further enhance NOx purification capability.

<SCR Catalyst>

The SCR catalyst according to an embodiment of the present disclosure includes zeolite having a primary particle size equal to or less than 0.5 μm. The zeolite is in a powdered state. Note that when the zeolite is in a powdered state, primary particles may be present in a dispersed state, or the primary particles may be aggregated to form so-called secondary particles that are larger in size than the primary particles.

Various types of zeolite may be used, as long as they have NOx purification capability. Further, naturally produced zeolites may be used, or zeolites synthesized by a given method may be used.

Zeolite having a CHA structure is used as an example of a desirable zeolite. The zeolite having a CHA structure is an oxygen eight-membered ring zeolite having a three-dimensional pore structure, and which mainly has a composition of $Ca_6^{2+}[Si_{24}Al_{12}O_{72}]$.

The DPF is provided with zeolite satisfying a condition that the primary particle size is equal to or less than 0.5 μm, thereby preparing the SCR/DPF catalyst. Accordingly, pressure loss is less likely to increase even when the DPF is provided with a large amount of SCR catalyst.

Further, it is desirable that 50% particle size of the zeolite measured by dynamic light scattering is equal to or less than 2.0 μm, and further it is desirable that the zeolite has a 90% particle size measured by dynamic light scattering equal to or less than 2.5 μm.

One obtained by slurrying the SCR catalyst is used when the SCR catalyst is provided to the DPF. Such slurry is prepared by dispersing the zeolite powder in water.

Note that it is desirable that 50% particle size of the slurried zeolite is equal to or less than 2.0 μm.

Further, it is desirable that the slurry has a viscosity equal to or less than 20 mPa·s at 25° C.

Embodiments

Next, embodiments according to the present disclosure will be described, however, the scope of the present disclosure is not limited to these embodiments.

Embodiments 1 to 6 and Comparative Examples 1 to 5

Zeolite powders having a CHA structure that are different in primary particle size, as well as 50% particle size ($D_{50}$) and 90% particle size ($D_{90}$) measured by dynamic light scattering, were dispersed in ion exchanged water to prepare slurries as SCR catalysts according to Embodiments 1 to 6 and Comparative examples 1 to 5.

An SiC-DPF (porosity 58%, cell thickness 11 mils, and cell density 350 cpi) manufactured by IBIDEN Co., Ltd. was provided with the prepared slurries, dried, and then fired at 450° C. or higher. The sample size was φ143.8 mm×127 mm.

Comparative Example 6

Comparative example 6 is a commercially available SCR/DPF catalyst according to the common technique. For this SCR/DPF catalyst, the SiC-DPF manufactured by IBIDEN Co., Ltd. was used as the DPF, and zeolite was used as the SCR catalyst. As a result of analyzing the SCR/DPF catalyst, zeolite providing amount was approximately 130 g/L.

Table 1 gives the primary particle size and the particle size measured by dynamic light scattering ($D_{50}$ and $D_{90}$)) of each of the zeolites according to Embodiments 1 to 6 and Comparative examples 1 to 6 described above, the particle size measured by dynamic light scattering ($D_{50}$ and $D_{90}$) and the viscosity of the slurries prepared using each of the zeolites, the amount of SCR catalyst adhering to DPF substrate, and the pressure loss of each of the prepared SCR/DPF catalysts (which will be described later). Note that, with respect to Comparative example 6, only the amount of SCR catalyst provided to DPF substrate and the pressure loss are given.

TABLE 1

| | Zeolite material used | | | Slurry prepared | | | | Pressure |
| --- | --- | --- | --- | --- | --- | --- | --- | --- |
| | Primary particle size (μm) | Particle size measured by dynamic light scattering ($D_{50}$ μm) | Particle size measured by dynamic light scattering ($D_{90}$ μm) | Particle size measured by dynamic light scattering ($D_{50}$ μm) | Particle size measured by dynamic light scattering ($D_{90}$ μm) | Viscosity (mPa·s at 25° C.) | Catalyst adhesion amount (g/L) | loss at 2 g/L after 1 hour soot accumulation (kPa) |
| Embodiment 1 | ≤0.5 | 1.7 | 2.4 | 1.6 | 2.4 | 5 | 94 | 2 |
| Embodiment 2 | ≤0.5 | 1.7 | 2.4 | 1.6 | 2.4 | 10 | 125 | 2.7 |
| Embodiment 3 | ≤0.5 | 1.7 | 2.4 | 1.6 | 2.4 | 16 | 146 | 3.5 |
| Embodiment 4 | ≤0.5 | 2.6 | 3.6 | 2.0 | 3.0 | 16 | 151 | 4.5 |
| Embodiment 5 | ≤0.5 | 2.6 | 3.6 | 1.6 | 2.6 | 16 | 146 | 4.5 |
| Embodiment 6 | ≤0.5 | 2.6 | 3.6 | 2.6 | 3.9 | 10 | 101 | 2.4 |
| Comparative Example 1 | 1.0 | 4.2 | 6.4 | 1.9 | 2.5 | 40 | 91 | 4.4 |
| Comparative Example 2 | 1.0 | 4.2 | 6.4 | 2.8 | 4.0 | 30 | 95 | 3.7 |

TABLE 1-continued

|  | Zeolite material used | | | Slurry prepared | | | Catalyst adhesion amount (g/L) | Pressure loss at 2 g/L after 1 hour soot accumulation (kPa) |
|---|---|---|---|---|---|---|---|---|
|  | Primary particle size (μm) | Particle size measured by dynamic light scattering ($D_{50}$μm) | Particle size measured by dynamic light scattering ($D_{90}$μm) | Particle size measured by dynamic light scattering ($D_{50}$μm) | Particle size measured by dynamic light scattering ($D_{90}$μm) | Viscosity (mPa·s at 25° C.) | | |
| Comparative Example 3 | 1.0 | 4.2 | 6.4 | 3.5 | 5.2 | 25 | 99 | 3.2 |
| Comparative Example 4 | 2.0 | 6.1 | 11.0 | 2.9 | 3.9 | 80 | 98 | 2.7 |
| Comparative Example 5 | 2.0 | 6.1 | 11.0 | 3.5 | 4.9 | 80 | 97 | 2.8 |
| Comparative Example 6 | — | — | — | — | — | — | 130 | 4.8 |

Note that the primary particle size was measured in the following manner.
(1) The zeolite powder was imaged at a magnification of 10,000 using an FE-SEM device.
(2) In the image captured by imaging, at least 20 or more of the smallest unit crystals having a cubic shape that is unique to a CHA structure were specified, and the size (Feret diameter) of each crystal was measured using image analysis software. The mean diameter of the measured crystal sizes was obtained as the primary particle size. Note that in cases where the crystals were in an aggregated state, the diagonal length of a face exposed on the surface was measured and the resulting measurement value was also used.

The dynamic light scattering particle size ($D_{50}$, $D_{90}$) was measured using an MT3300EX (Microtrac Bell Co., Ltd.). In addition, the slurry viscosity was measured using a cylindrical rotary viscometer VT-03F (RION Co., Ltd.).

Figure 3A:
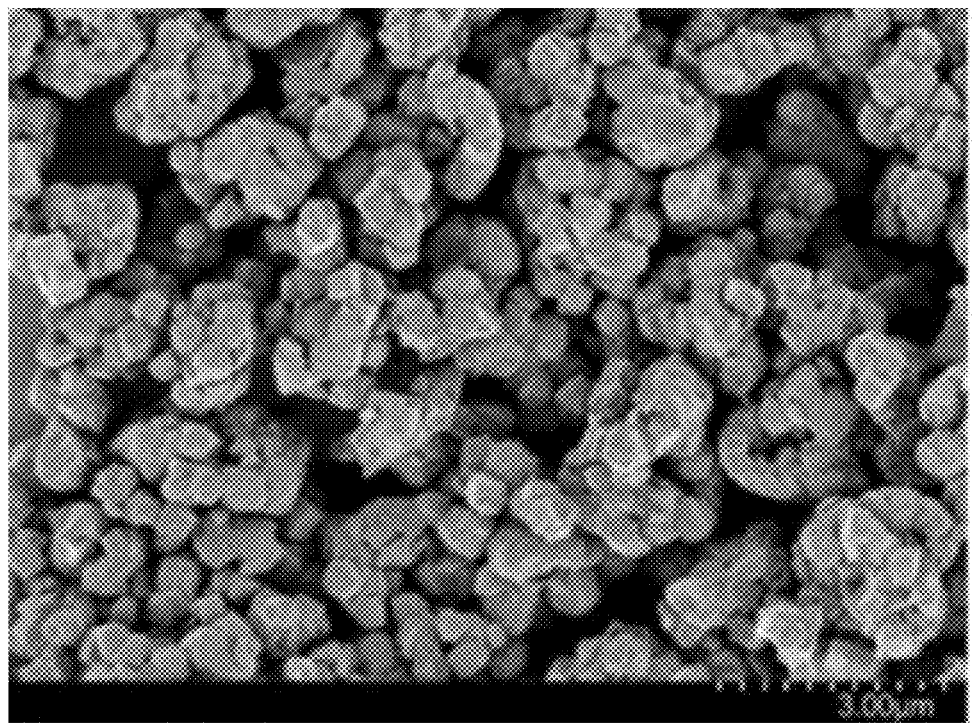
FIG. 3A illustrates an electron microscope image of zeolite having a primary particle size equal to or less than 0.5 μm.
Figure 3B:
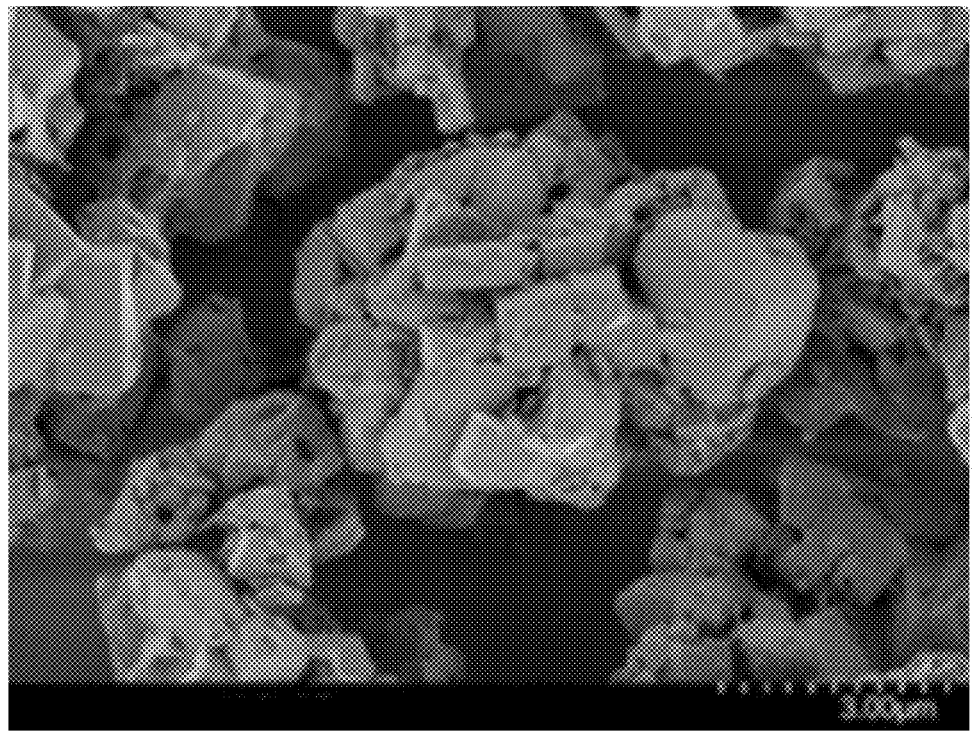
FIG. 3B illustrates an electron microscope image of zeolite having a primary particle size of 1.0 μm.
Figure 3C:
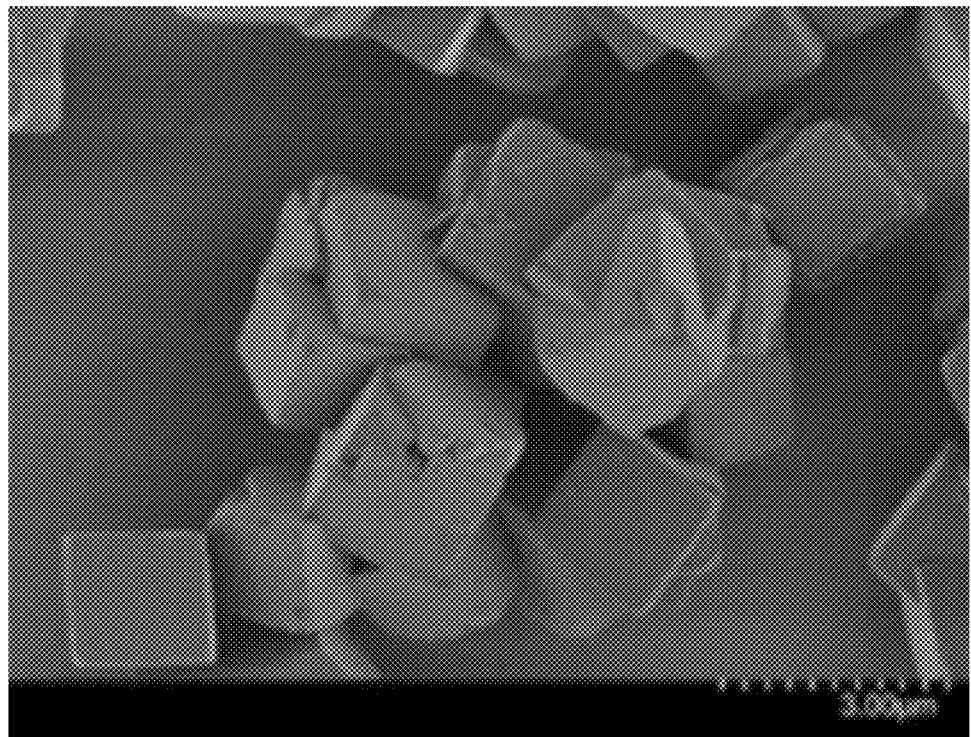
FIG. 3C illustrates an electron microscope image of zeolite having a primary particle size of 2.0 μm.

An electron microscope image of zeolite having a primary particle size equal to or less than 0.5 μm (Embodiments 4 to 6) is illustrated in FIG. 3A, an electron microscope image of zeolite having a primary particle size of 1 μm (Comparative examples 1 to 3) is illustrated in FIG. 3B, and an electron microscope image of zeolite having a primary particle size of 2 μm (Comparative examples 4 and 5) is illustrated in FIG. 3C, respectively.

Pressure loss was measured by the following method. PM were supplied to the SCR/DPF catalyst prepared as described above for one hour at an addition rate of 2 g/L·H (Hour), while air was circulated at a rate of 2.5 Nm³/min at room temperature (25° C.), and the PM were collected using the SCR/DPF catalyst. Pressure loss was measured after collection. Note that Carbon Black 7100F manufactured by Tokai Carbon Co., Ltd. was used as the PM.

Figure 2:
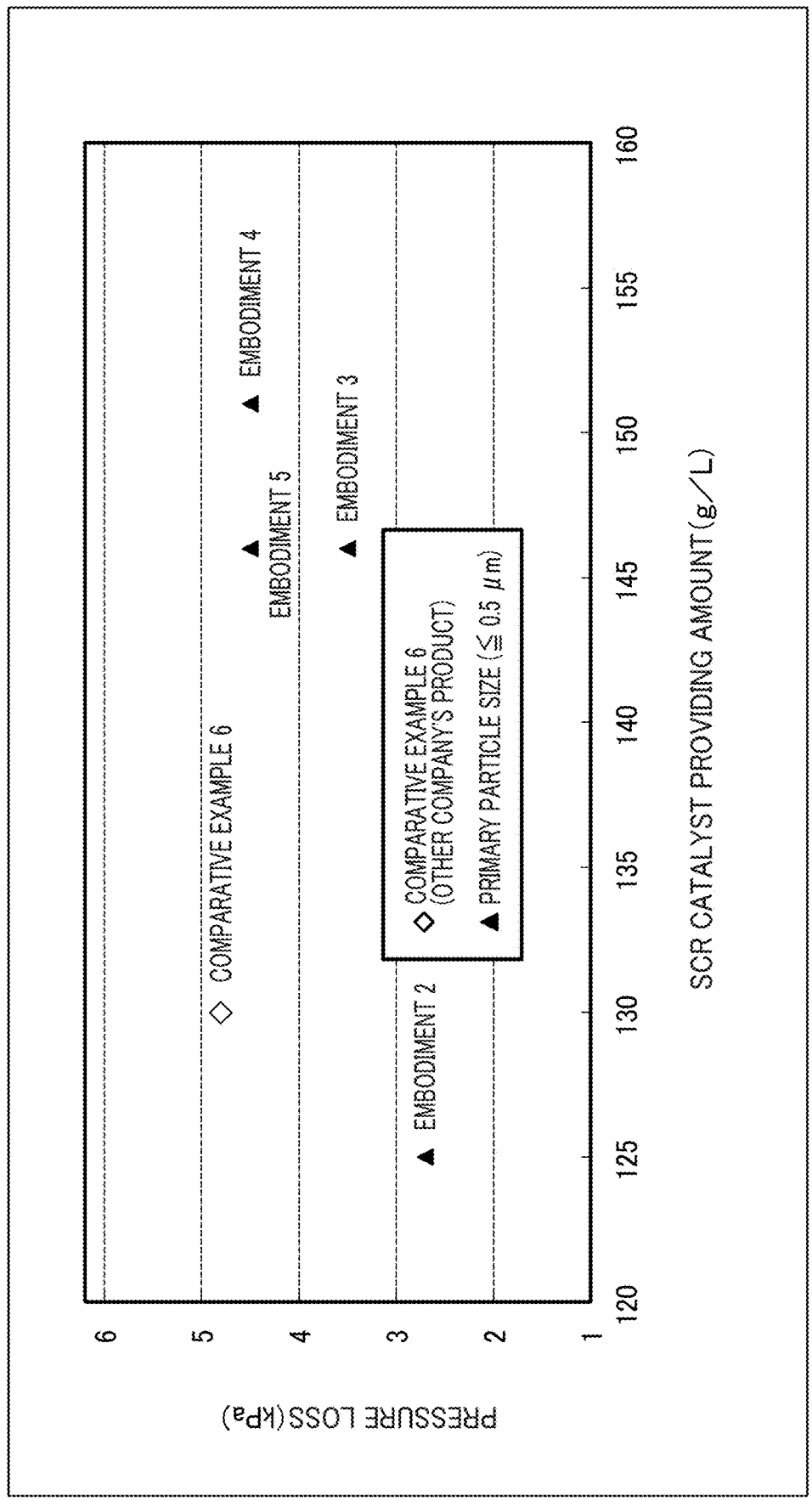
FIG. 2 is a graph illustrating a relationship between the amount of SCR catalyst provided to DPF and pressure loss in embodiments and comparative examples.

FIG. 1 illustrates, as a graph, a relationship between the SCR catalyst providing amount in the SCR/DPF catalyst according to Embodiments 1 and 6 and Comparative examples 1 to 5, and pressure loss, and FIG. 2 illustrates, as a graph, a relationship between the SCR catalyst providing amount in the SCR/DPF catalyst according to Embodiments 2 to 5 and Comparative example 6, and pressure loss measured under the foregoing condition, respectively. Specifically, in FIG. 1, the horizontal axis represents the SCR catalyst providing amount in the SCR/DPF catalyst (ranging from 90 to 102 g/L), and the vertical axis represents pressure loss. In FIG. 2, the horizontal axis represents the SCR catalyst providing amount of the SCR/DPF catalyst (ranging from 120 to 160 g/L), and the vertical axis represents pressure loss.

As is apparent from FIG. 1, it is understood that the SCR/DPF catalysts in Embodiments 1 and 6 manufactured by providing the DPF with the slurry prepared using the zeolite having a primary particle size equal to or less than 0.5 μm can restrain an increase in pressure loss, in a range of the SCR catalyst providing amount from 90 to 102 g/L, more than in the comparative examples that used zeolite having a primary particle size of 1 μm or zeolite having a primary particle size of 2 μm. Specifically, the SCR/DPF catalyst in Embodiment 6 was able to restrain pressure loss to a low level, although the SCR catalyst providing amount in Embodiment 6 is greater than the SCR catalyst providing amounts in Comparative examples 1 to 5.

FIG. 2 illustrates differences and the like between the SCR/DPF catalysts according to embodiments of the present disclosure and the SCR/DPF catalyst according to the common technique, in cases where a large amount of the SCR catalyst, such as 120 to 160 g/L thereof, is provided. As is apparent from FIG. 2, the SCR/DPF catalysts in Embodiments 3 to 5 manufactured by providing the DPF substrate with the slurry prepared using zeolite having a primary particle size equal to or less than 0.5 μm was able to restrain pressure loss to a low level, although the SCR catalyst providing amounts thereof in Embodiments 3 to 5 are greater than those of the commercially available SCR/DPF catalyst in Comparative example 6 according to the common technique.

Further, it is understood that the SCR/DPF catalysts in Embodiments 2 and 3 using zeolite having 50% particle size equal to or less than 2.0 μm and 90% particle size equal to or less than 2.5 μm both measured by dynamic light scattering, and satisfying a condition that 50% particle size of the slurried zeolite is equal to or less than 2.0 μm, can further restrain pressure loss more than in Embodiments 4 and 5 using zeolite having 50% particle size of 2.6 μm and 90% particle size of 3.6 μm both measured by dynamic light scattering. Especially, the difference is apparent when comparing Embodiment 3 and Embodiment 5 both having the same SCR catalyst providing amount of 146 g/L. The SCR/DPF catalyst in Embodiment 3 was able to restrain increase in pressure loss by 1.3 kPa lower than the SCR/DPF catalyst in Comparative example 6, although the SCR catalyst providing amount in Embodiment 3 is 10% greater or more than the SCR catalyst providing amount of approximately 130 g/L in Comparative example 6.

The invention claimed is:
1. An exhaust gas purification catalyst comprising:
a diesel particulate filter provided with a zeolite having a primary particle size equal to or less than 0.5 μm.

2. The exhaust gas purification catalyst according to claim 1, wherein 50% particle size of the zeolite measured by dynamic light scattering is equal to or less than 2.0 μm.

3. The exhaust gas purification catalyst according to claim 1, wherein 90% particle size of the zeolite measured by dynamic light scattering is equal to or less than 2.5 μm.

4. The exhaust gas purification catalyst according to claim 1, wherein 50% particle size of the zeolite when the zeolite is in a slurried state is equal to or less than 2.0 μm.

5. The exhaust gas purification catalyst according to claim 4, wherein the slurry has a viscosity equal to or less than 20 mPa·s at 25° C.

* * * * *